United States Patent
Xu

(10) Patent No.: US 9,042,719 B2
(45) Date of Patent: May 26, 2015

(54) MAGNETIC LENS FILTERS AND ADAPTER ASSEMBLIES FOR A CAMERA

(71) Applicant: Ye Xu, Bellaire, TX (US)

(72) Inventor: Ye Xu, Bellaire, TX (US)

( * ) Notice: Subject to any disclaimer, the term of this patent is extended or adjusted under 35 U.S.C. 154(b) by 0 days.

(21) Appl. No.: 14/083,999

(22) Filed: Nov. 19, 2013

(65) Prior Publication Data

US 2014/0140688 A1 May 22, 2014

Related U.S. Application Data

(60) Provisional application No. 61/728,430, filed on Nov. 20, 2012.

(51) Int. Cl.
G03B 11/00 (2006.01)
G02B 7/00 (2006.01)
G03B 17/56 (2006.01)

(52) U.S. Cl.
CPC ............... G03B 11/00 (2013.01); G02B 7/006 (2013.01); G03B 17/566 (2013.01); Y10S 359/903 (2013.01)

(58) Field of Classification Search
USPC ............................ 396/544; 359/885, 892, 903
See application file for complete search history.

(56) References Cited

U.S. PATENT DOCUMENTS

| | | | | | |
|---|---|---|---|---|---|
| 2,707,418 | A | * | 5/1955 | Magnuson | 359/818 |
| 4,684,231 | A | * | 8/1987 | Athy | 396/544 |
| 5,040,011 | A | * | 8/1991 | Tiffen | 396/544 |
| 5,208,624 | A | * | 5/1993 | MacKay | 396/544 |
| 6,889,006 | B2 | * | 5/2005 | Kobayashi | 396/6 |
| 8,014,666 | B2 | * | 9/2011 | Neiman | 396/533 |
| 2010/0183292 | A1 | * | 7/2010 | Neiman | 396/533 |
| 2011/0026916 | A1 | * | 2/2011 | Neiman | 396/533 |

* cited by examiner

*Primary Examiner* — Clayton E Laballe
*Assistant Examiner* — Warren K Fenwick
(74) *Attorney, Agent, or Firm* — Benjamin Aaron Adler

(57) ABSTRACT

Provided herein are devices and system to magnetically, rotably secure a lens filter to a camera. Generally the devices and systems comprise a magnet assembly and a lens filter assembly threadably engageable. Also provided are magnetic lens filter systems comprising the engaged magnet and lens filter assemblies and an attachment assembly securable around a camera lens and magnetically attachable to the magnet comprising the magnetic lens filter, magnetic adapter assembly or magnetic adapter. Further provided are camera systems comprising the magnetic lens filter systems rotatably affixed thereto.

6 Claims, 17 Drawing Sheets

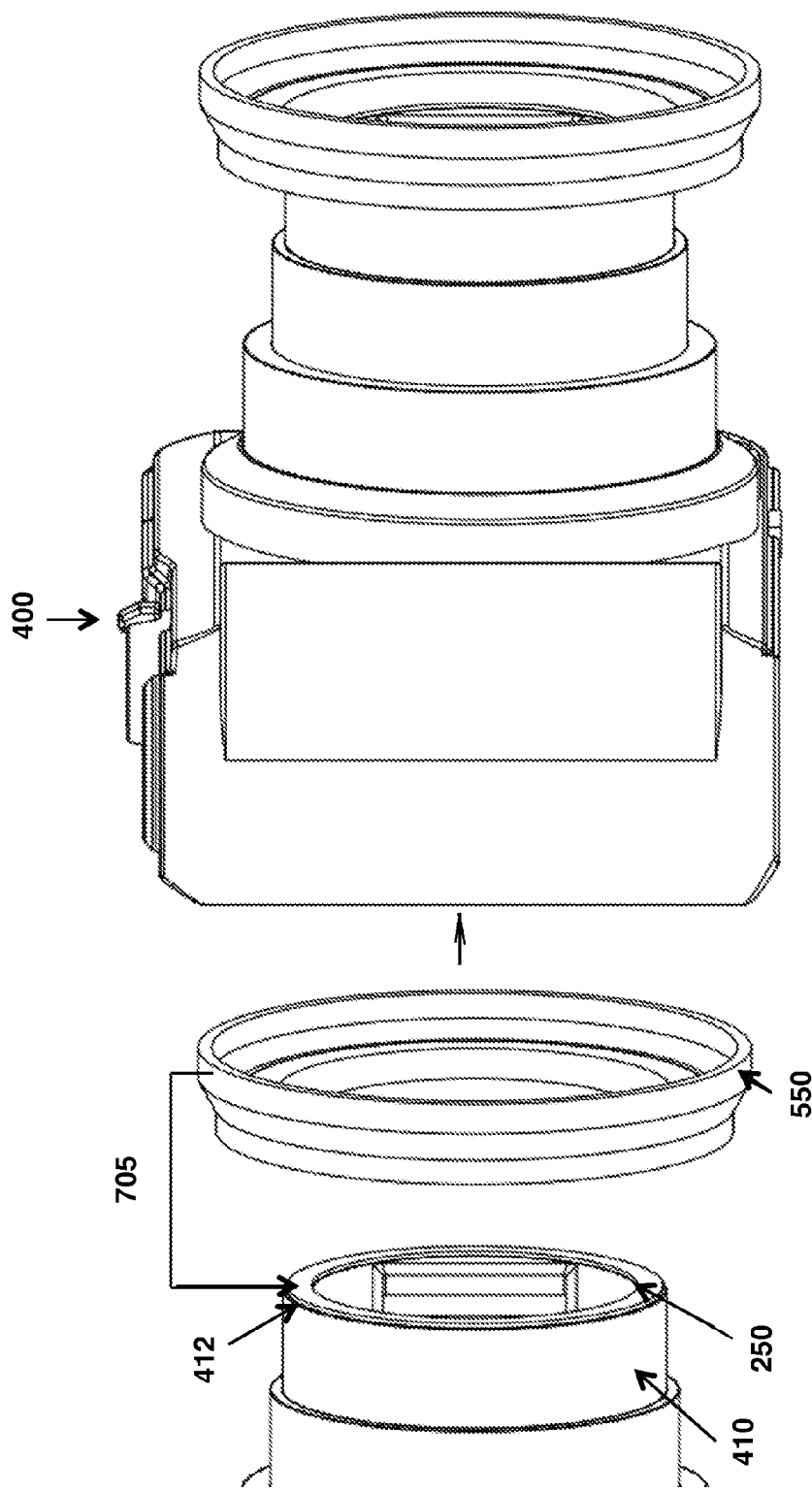

US 9,042,719 B2

MAGNETIC LENS FILTERS AND ADAPTER ASSEMBLIES FOR A CAMERA

CROSS-REFERENCE TO RELATED APPLICATIONS

This application is a non-provisional under 35 U.S.C. §119(e) of provisional application U.S. Ser. No. 61/728,430, filed Nov. 20, 2012, now abandoned, the entirety of which is hereby incorporated by reference.

BACKGROUND OF THE INVENTION

1. Field of the Invention

The present invention relates generally to the fields of digital photography and photographic lens filters. More specifically, the present invention relates to a lens filter with a magnetic attachment means that protects the magnet and that requires minimal alteration of the camera.

2. Description of the Related Art

Current commercial lens filters with a magnetic attachment means have several drawbacks. One significant problem is that the lens filter is simply inserted into a size complimentary magnetic ring. The lens filter optionally can comprise an adhesive intermittently disposed around the perimeter to increase adhesion to the camera lens. Moreover, the magnetic adapter is only snapped on over the camera lens and not secured by any other means. As such, the components can be dislodged easily during use, transport or storage and may be lost or damaged. For example, because the lens filter and the magnet are exposed, they may become scratched. Furthermore, the magnet and the magnetic metal components of the adapter may rust thereby affecting both the performance and appearance of the magnetic lens filter.

Thus, there is a recognized need in the art for an improved magnetic lens filter and system. Particularly, the prior art is deficient in a magnetic lens filter that securely attaches to the camera lens while protecting the magnets from damage. The present invention fulfills this longstanding need and desire in the art.

SUMMARY OF THE INVENTION

The present invention is directed to a magnetic lens filter for a camera. The magnetic lens filter comprises a magnet assembly and a lens assembly threadably engageable with the magnet assembly.

The present invention is directed further still a magnetic adapter assembly for a lens filter. The magnetic adapter assembly comprises a threaded magnet frame assembly having a magnet disposed therein and a threaded lens filter frame configured to receive a threaded lens filter therein such that the threaded lens filter frame is threadably engaged to the threaded magnet frame. The present invention is directed to a related magnetic adapter assembly further comprising the threaded lens filter disposed within and threadably engaged with the threaded lens filter frame.

The present invention is directed further to a magnetic adapter for a lens filter for a camera lens. The magnetic adapter comprises a magnet portion and a threaded frame portion configured to threadably receive a lens filter therein and that is threadably engaged with the magnet portion. The present invention is directed to a related magnetic adapter further comprising the lens filter disposed within the threaded frame portion.

The present invention is directed further still to magnetic lens filter systems. The magnetic lens filter system comprise the magnetic lens filter, the magnetic adapter assembly or the magnetic adapter described herein and an attachment assembly securable around a camera lens and magnetically engageable with the magnetic lens filter.

The present invention is directed further still to a camera system with rotatable lens filter. The camera system comprises a camera with camera lens, the attachment assembly described herein adhesively secured around the camera lens and the magnetic lens filter systems described herein disposed in a covering relationship to the camera lens such that the magnet comprising the systems is magnetically and rotatably attached to the attachment frame.

Other and further aspects, features, and advantages of the present invention will be apparent from the following description of the presently preferred embodiments of the invention given for the purpose of disclosure.

BRIEF DESCRIPTION OF THE DRAWINGS

So that the matter in which the above-recited features, advantages and objects of the invention, as well as others that will become clear, are attained and can be understood in detail, more particular descriptions of the invention briefly summarized above may be had by reference to certain embodiments thereof that are illustrated in the appended drawings. These drawings form a part of the specification. It is to be noted, however, that the appended drawings illustrate preferred embodiments of the invention and therefore are not to be considered limiting in their scope.

FIG. 7A depicts the attachment of the magnetic attachment assembly to the camera lens

DETAILED DESCRIPTION OF THE INVENTION

Figure 1:
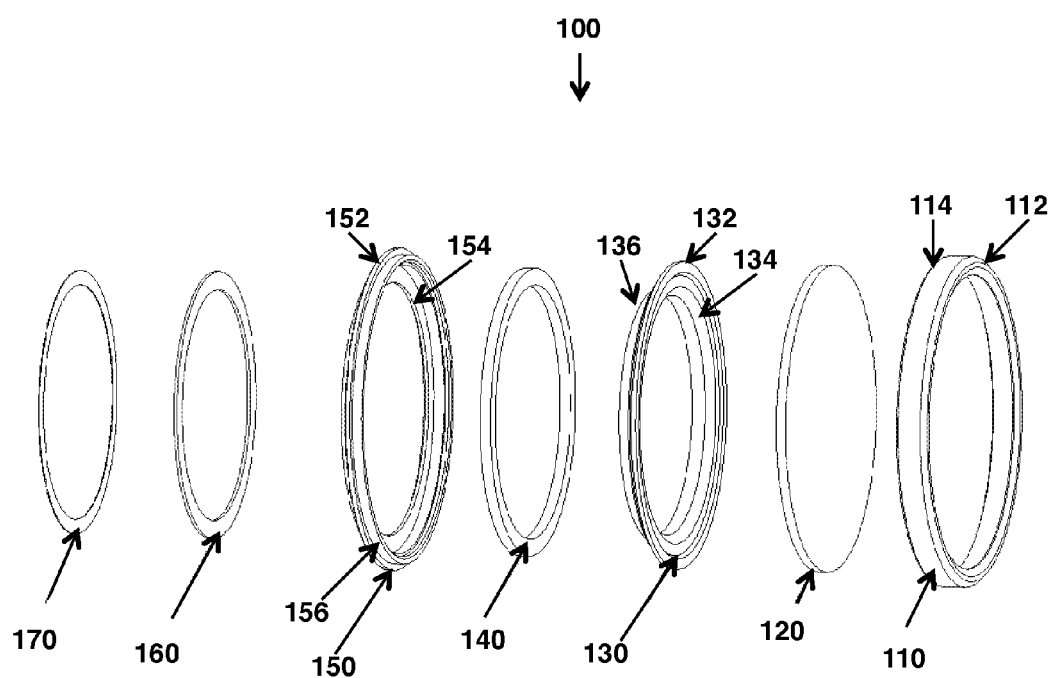
FIG. 1 is an exploded view of the components of one embodiment of the magnetic lens filter system.

As used herein in the specification, "a" or "an" may mean one or more. As used herein in the claim(s), when used in conjunction with the word "comprising", the words "a" or "an" may mean one or more than one.

As used herein "another" or "other" may mean at least a second or more of the same or different claim element or components thereof. Similarly, the word "or" is intended to include "and" unless the context clearly indicates otherwise. "Comprise" means "include."

As used herein, the term "about" refers to a numeric value, including, for example, whole numbers, fractions, and percentages, whether or not explicitly indicated. The term "about" generally refers to a range of numerical values (e.g., +/−5-10% of the recited value) that one of ordinary skill in the art would consider equivalent to the recited value (e.g., having the same function or result). In some instances, the term "about" may include numerical values that are rounded to the nearest significant figure.

In one embodiment of the present invention there is provided a magnetic lens filter for a camera, comprising a magnet assembly; and a lens filter assembly threadably engageable with the magnet assembly. In this embodiment the magnet assembly may comprise a magnet disposed within a stabilizing framework. In one aspect of this embodiment the magnet assembly may comprise an exteriorly threaded outer stabilizing frame; the magnet disposed within the outer stabilizing frame and an inner stabilizing frame disposed proximate to the magnet within the outer stabilizing frame. In another aspect the lens filter assembly may comprise an interiorly threaded outer lens filter frame and a lens filter disposed therein.

In a related embodiment of the present invention there is provided a magnetic lens filter system, comprising the magnetic lens filter as described supra; and an attachment assembly securable around a camera lens and magnetically engageable with the magnetic lens filter. In this related embodiment the attachment assembly may comprise an attachment frame having a magnetic metal incorporated therein and an adhesive disposed on an inner surface of the attachment frame.

In another related embodiment of the present invention there is provided a camera system with rotatable lens filter, comprising a camera with camera lens; the attachment assembly as described supra adhesively secured around the camera lens; and the magnetic lens filter disposed in a covering relationship to the camera lens such that the magnet comprising the magnetic lens filter is magnetically and rotatably attached to the attachment frame.

In another embodiment of the present invention there is provided a magnetic adapter assembly for a lens filter, comprising a threaded magnet frame assembly having a magnet disposed therein; and a threaded lens filter frame configured to receive a threaded lens filter therein such that the threaded lens filter frame is threadably engaged to the threaded magnet frame. Further to this embodiment the magnetic adapter assembly may comprise the threaded lens filter disposed within and threadably engaged with the threaded lens filter frame.

In both embodiments the magnetic adapter assembly may comprise a threaded outer stabilizing frame with the magnet disposed therein, the threaded lens filter frame and an inner stabilizing frame disposed within the threaded lens filter frame proximately to and in a stabilizing relationship to the magnet. Also in both embodiments the threaded lens filter frame may comprise an exteriorly threaded back portion and an interiorly threaded front portion and the outer stabilizing frame may be interiorly threaded.

In a related embodiment of the present invention there is provided a magnetic lens filter system, comprising the magnetic adapter assembly and an attachment assembly both as described supra.

In another related embodiment of the present invention there is provided a camera system with rotatable lens filter, comprising a camera with camera lens; the attachment assembly as described supra adhesively secured around the camera lens; and the magnetic adapter assembly disposed in a covering relationship to the camera lens such that the magnet comprising the magnetic adapter assembly is magnetically and rotatably attached to the attachment frame.

In yet another embodiment of the present invention there is provided a magnetic adapter for a lens filter comprising a magnet portion; and a threaded frame portion configured to threadably receive a lens filter therein and that is threadably engaged with the magnet portion. Further to this embodiment the magnetic adapter comprises the lens filter disposed within the threaded frame portion. In both embodiments the threaded frame portion may be exteriorly threaded and the outer stabilizing frame may be interiorly threaded.

In a related embodiment of the present invention there is provided a magnetic lens filter system, comprising the magnetic adapter and an attachment assembly both as described supra.

In another related embodiment of the present invention there is provided a camera system with rotatable lens filter, comprising a camera with camera lens; the attachment assembly as described supra adhesively secured around the camera lens; and the magnetic adapter disposed in a covering relationship to the camera lens such that the magnet comprising the magnetic adapter is magnetically and rotatably attached to the attachment frame.

Provided herein are magnetic lens filter, adapters and adapters designed for use on a compact camera. A strong magnet comprising the systems magnetically attaches to a camera lens via a very thin metal ring or attachment frame without interfering with the line or sight through the camera lens and lens filter or with the optics thereof. The magnetic lens filter devices and systems may comprise a magnetic lens filter into which the lens filter is permanently incorporated or may comprise a magnetic adapter assembly or a magnetic adapter device which are configured to removably, but securely, receive the lens filter.

The magnetic lens filter devices and systems are a fast and easy way to removably, yet securely, attach a lens filter to a camera with minimal alteration to the camera. This enables a user to easily and quickly rotate the lens filter around the lens to correctly orient the filter on the lens as per the user's requirements for any particular photographic opportunity. Utilizing an open circular magnet ensures that the lens filter will remain secured to the camera during transport or use, yet can be quickly removed if necessary.

The lens filter body may comprise aluminum. The lens filter comprises high quality coated glass optics as are known and standard in the art. The magnetic lens filter systems can fit various cameras and are configured to incorporate or to receive lens filters of various sizes. Preferably, the diameter of the lens filter is about 36 mm for smaller cameras or about 42 mm for larger cameras. The lens filter is securely magnetically attached to the camera all around the outer perimeter of the lens.

In one general non-limiting example a magnetic lens filter that may comprise a lens filter assembly threadably engaged with a stabilized magnet assembly. The lens filter assembly includes an outer lens filter frame and a lens filter disposed within. The stabilized magnet assembly may have a magnet disposed within an outer stabilizing frame and an inner stabilizing frame disposed proximate to the magnet to stabilize the same within the outer stabilizing frame.

In another general non-limiting example a magnetic adapter assembly for a lens filter may comprise a magnet disposed within an outer stabilizing frame, a threaded lens filter frame configured to receive a lens filter therein and to threadably engage with the outer stabilizing frame. An inner stabilizing frame may be disposed within the threaded lens filter frame proximate to the magnet to stabilize the same within the outer stabilizing frame. In yet another non-limiting example a magnetic adapter for a lens filter may comprise a magnet portion and a threaded frame portion configured to receive a lens filter therein.

The magnetic lens filter systems provided herein may comprise, but are not limited to the magnetic lens filters, assemblies and adapters described herein and mean for attaching the same around a camera lens. For example, the attachment means may comprise an attachment assembly having an attachment frame incorporating a magnetic metal, such as iron, and an adhesive attachment means. The adhesive attaches the attachment frame around a camera lens and the magnet comprising the magnetic lens filters, assemblies and adapters magnetically attaches to the attachment frame.

As such, a camera or camera system with a rotatable lens filter is provided herein. The camera or camera system may have the attachment means secured or adhered around the camera lens. Any of the magnetic lens filters, assemblies or adapters described herein are magnetically secured to the attachment means, for example, to the magnetic attachment frame. The magnet enables the magnetic lens filter to be rotated around the camera lens with the magnetic lens filter remaining magnetically attached.

As described below, the invention provides a number of advantages and uses, however such advantages and uses are not limited by such description. Embodiments of the present invention are better illustrated with reference to the Figure(s), however, such reference is not meant to limit the present invention in any fashion. The embodiments and variations described in detail herein are to be interpreted by the appended claims and equivalents thereof.

FIG. 1 is an exploded view of the magnetic lens filter system 100. The magnetic lens filter comprises, from the front, an outer lens filter frame 110, a lens filter 120, an inner stabilizing frame with flange 130, a magnet 140, and an outer stabilizing frame with flange 150. The system further comprises an attachment frame 160 and a double-sided adhesive means 170.

The outer lens filter frame is an open circular frame with a supporting lip 112 extending interiorally from the front edge and interior threads around the inner surface at the back edge 114. The outer lens filter frame has inner dimensions sufficient to receive and stabilize the lens filter therein. The lens filter 120 can be any filter designed for a camera lens, such as, but not limited to, a polarizing lens filter. Lens filters are known and commercially available.

The inner stabilizing frame 130 is an open, circular frame with a flange 132 extending exteriorally from and around a front edge 134 of the frame. The magnet 140 is a ring with an open circular form and outer dimensions sufficient for the magnet to be securely disposed and supported within the outer stabilizing frame 150. The outer stabilizing frame 150 is an open, circular frame with a flange 152 extending exteriorally from and around a back edge of the frame and a supporting lip 154 extending interiorally from the back edge. The outer surface of the outer stabilizing frame is exteriorally threaded 156 at the front edge. The back portion of the outer stabilizing frame generally and the supporting lip particularly also provide protective covering for the magnet and may comprise a magnetic material. Thus, when not magnetically attached to the attachment frame 160, the magnet is protected from the environment, dirt, corrosion, damage, etc.

The attachment frame 160 is an open circular structure comprising iron for magnetic attraction to the magnet. The double-side adhesive means 170, for example, but not limited to, a double-sided tape, is a single piece of tape with dimensions sufficient to cover and adhere to the back surface of the attachment frame.

Figure 2A:
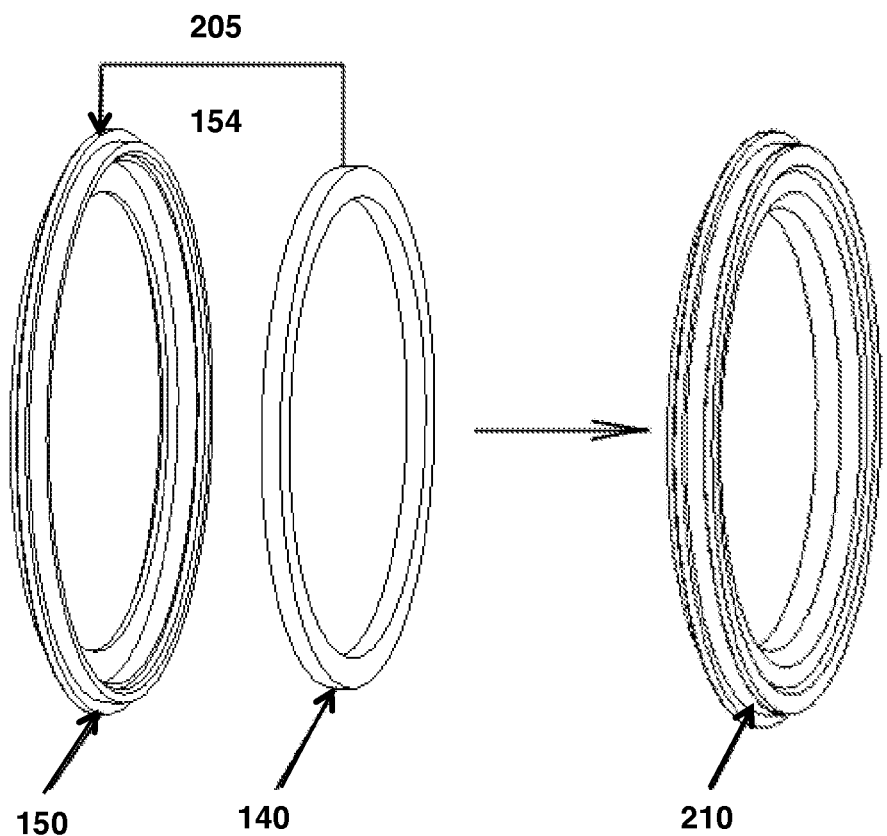
FIGS. 2A-2E depict the assembly of this embodiment of the magnetic lens filter system components.

With continued reference to FIG. 1, FIGS. 2A-2E illustrate the assembly of the magnetic lens filter system. In FIG. 2A, the magnet 140 is loaded through the open front of the outer stabilizing frame 150 at 205 such that the back surface of the magnet 140 is disposed against the lip 154 thereof to form magnet assembly 210.

Figure 2B:
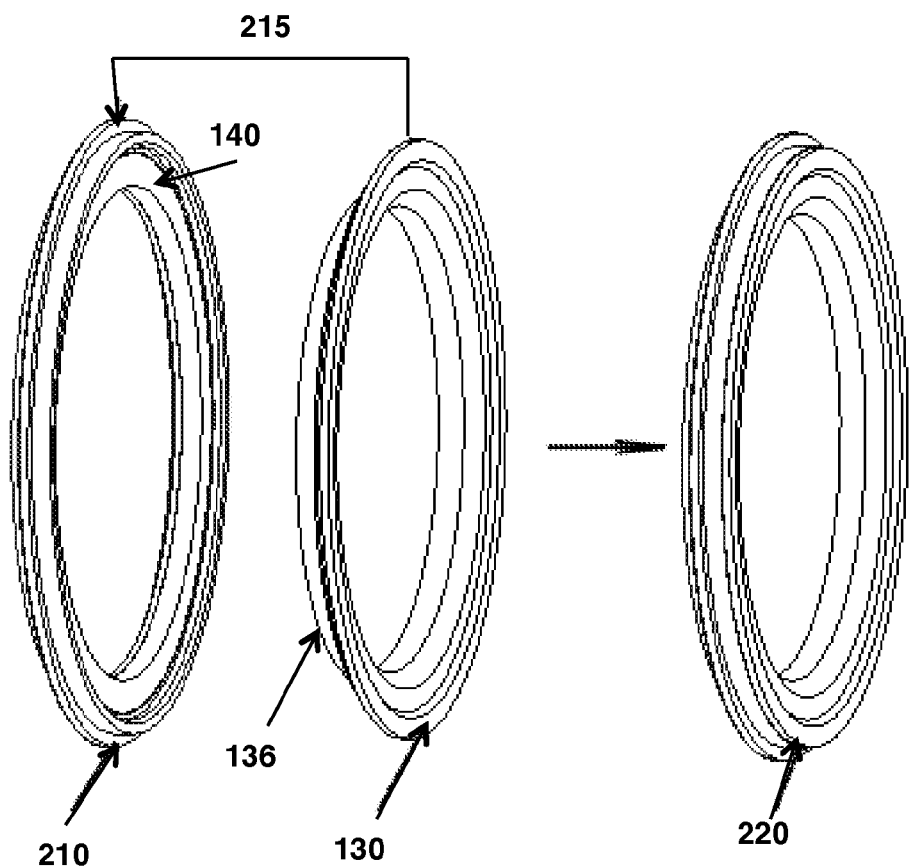

In FIG. 2B the inner stabilizing frame 130 is loaded into the front of magnet assembly 210 at 215 to form stabilized magnet assembly 220. The back edge of the inner stabilizing frame is disposed within assembly 220 such that the back surface 136 of the inner stabilizing frame is proximate to the front of the magnet 140 and the back surface of flange 132 is proximate to the front edge of assembly 220.

Figure 2C:
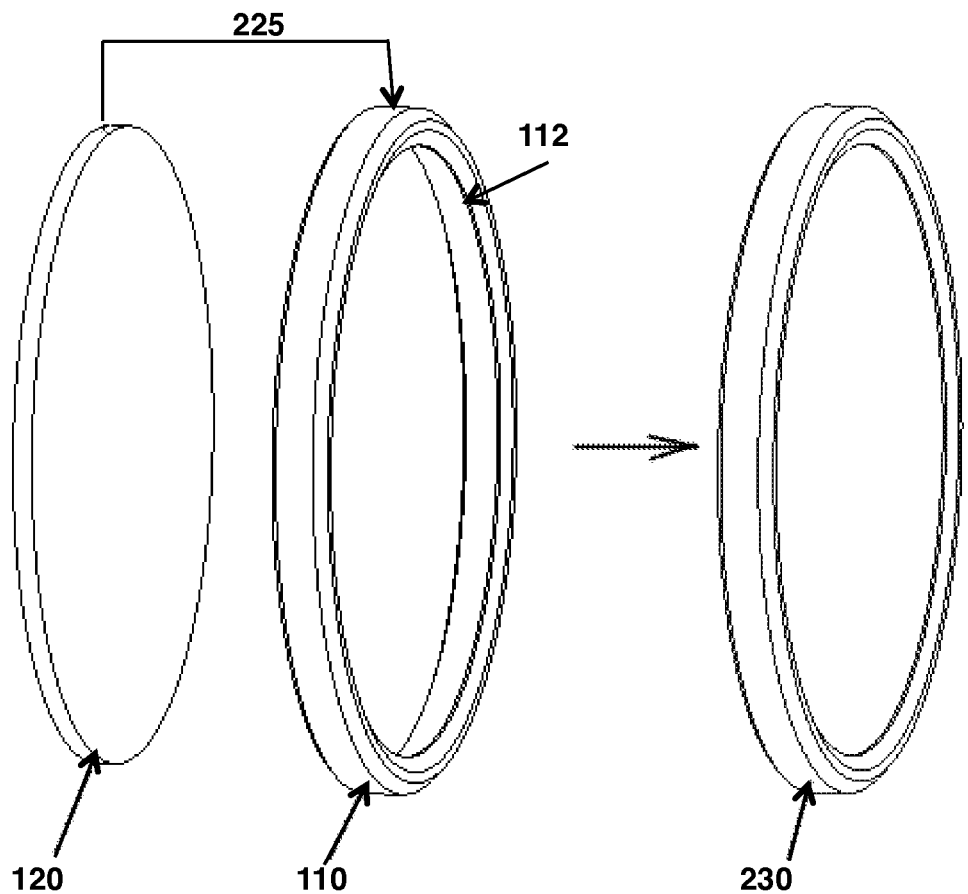

In FIG. 2C the lens filter 120 is loaded at 225 into the outer lens filter frame 110 through the open back to form lens filter assembly 230. The front of the lens filter is disposed proximate to the back surface of the lip 112.

Figure 2D:
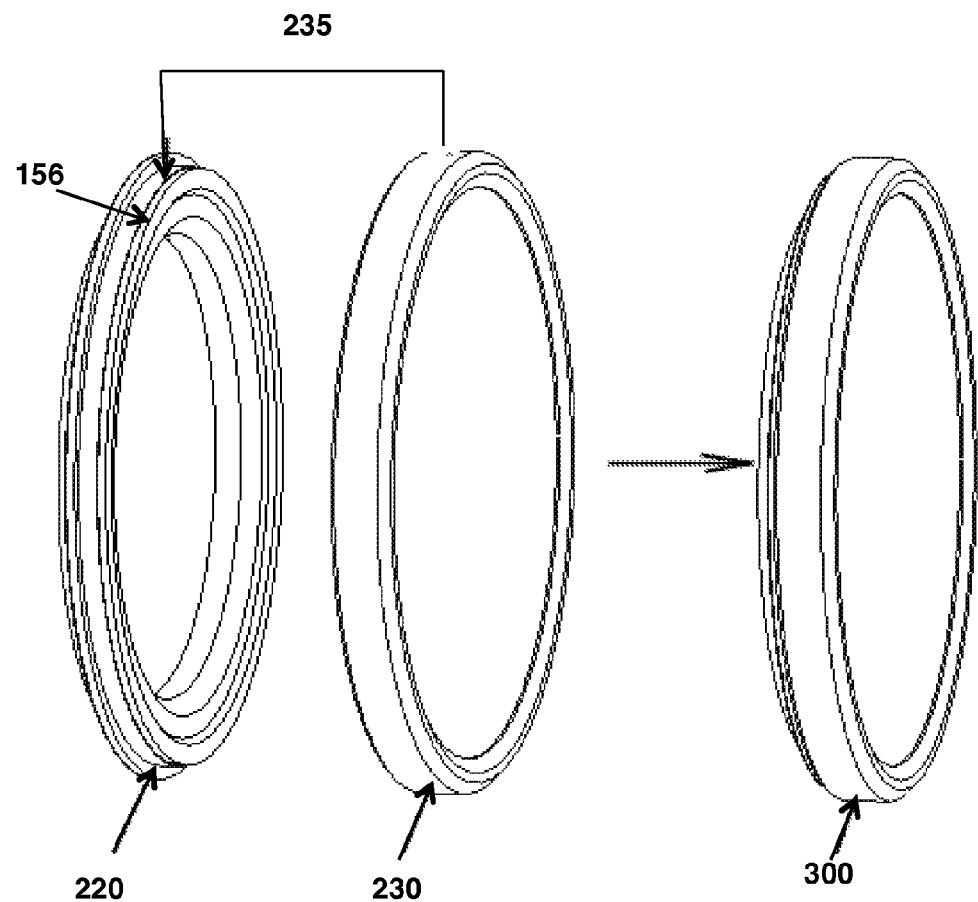

In FIG. 2D the stabilized magnet assembly 220 is joined with the lens filter assembly 230 at 235 to form magnetic lens filter 300. The exterior threads 156 of the outer stabilizing frame comprising stabilized magnet assembly 220 threadably engage the interior threads (not shown) of the outer lens filter frame 110 comprising assembly 230. The lens filter 120 and the magnet 140 are stably secured within magnetic lens filter assembly 240 where the magnet comprises the back surface of assembly 240 and the lens filter comprises the front surface thereof.

Figure 2E:
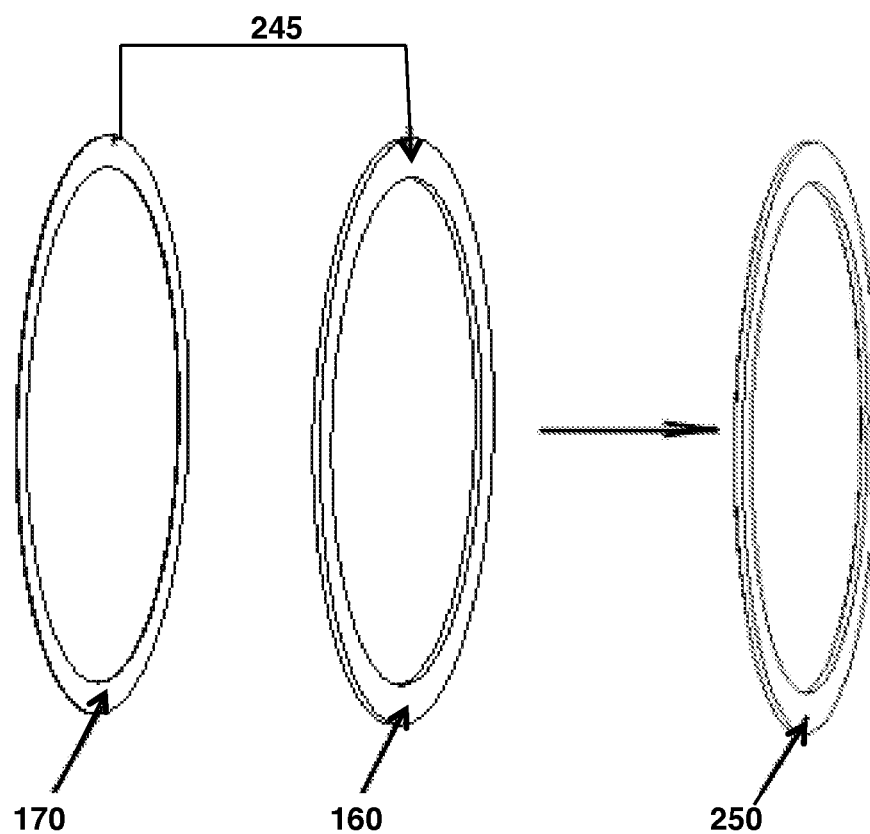

In FIG. 2E the adhesive means 170, such as double-sided tape, is applied at 245 to the back surface of the attachment frame 160 to form attachment assembly 250. The adhesive means adheres uniformly around the back surface of the attachment frame.

Figure 3A:
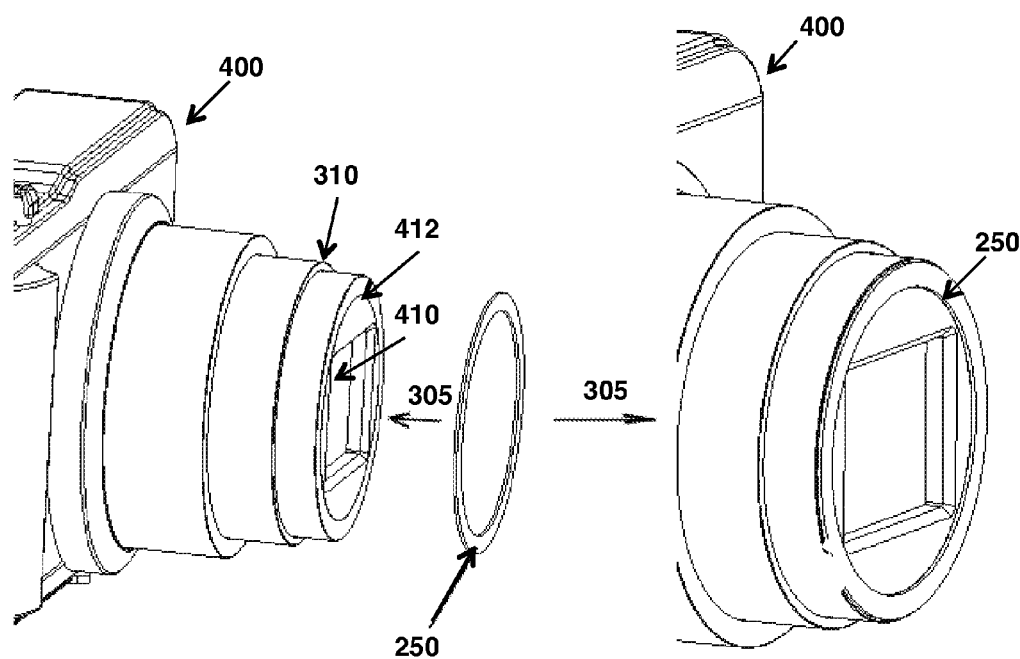
FIG. 3A depict the placement of the attachment frame on the camera.
Figure 3B:
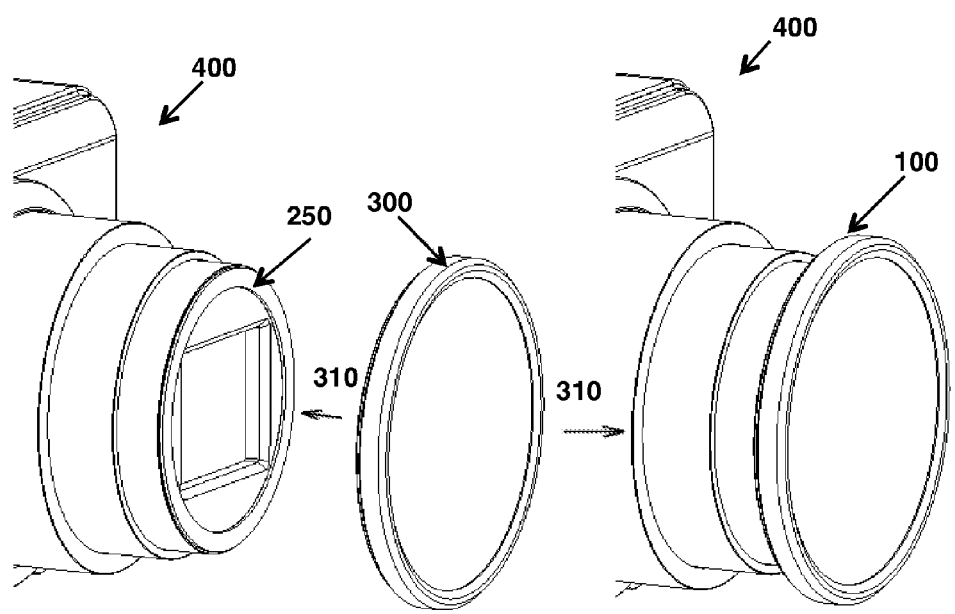
FIG. 3B depicts the magnetic lens filter magnetically attached to the camera lens.

With continued reference to FIGS. 2A-2E, FIGS. 3A-3B illustrate the magnetic attachment of the magnetic lens filter to a camera lens. In FIG. 3A, the attachment assembly 250 is affixed uniformly at 305 via the exposed adhesive side of the double-sided tape (not shown) to encircle the outer surface 412 of a camera lens 410 on a camera 400. As shown in FIG. 3B, the magnetic lens filter 300 is positioned at 310 proximate to the front surface of the attachment assembly 250 such that magnetic attraction between the magnet 140 and the attachment frame 110 magnetically adheres the magnetic lens filter 300 thereto to form the magnetic lens filter system 100.

Figure 4:
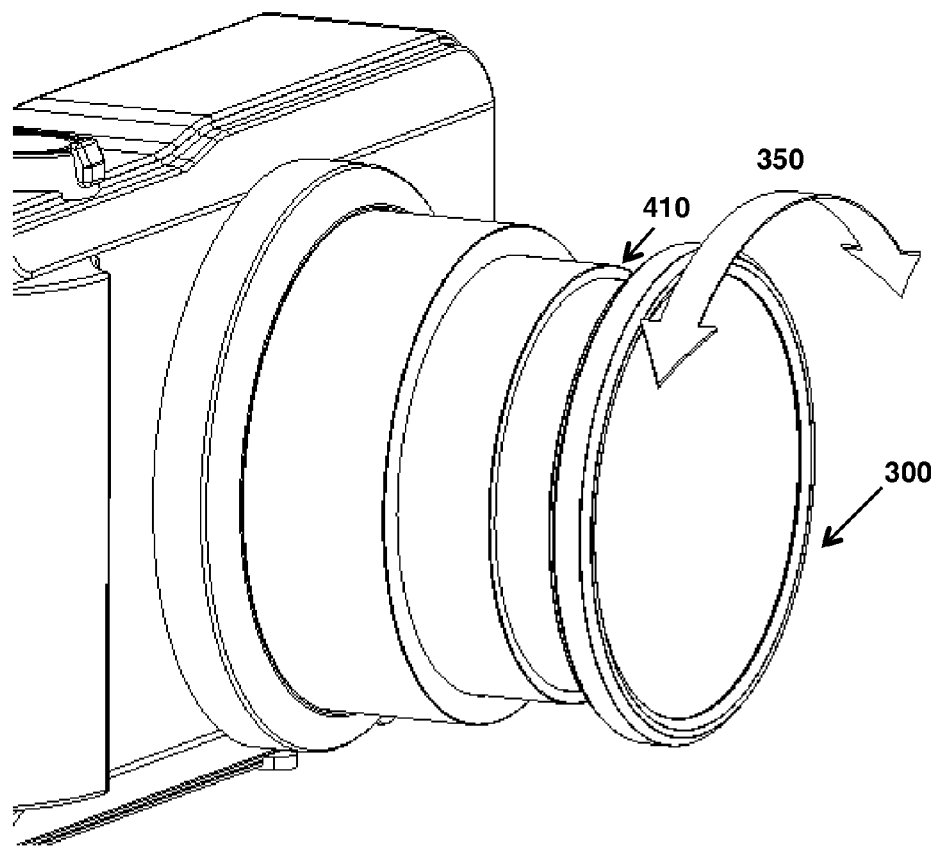
FIG. 4 depicts how the magnetic lens filter is adjusted on the camera lens.

With continued reference to FIGS. 3A-3B, FIG. 4 illustrates how the magnetic lens filter 300 is rotatably adjustable on the camera lens 410. The magnetic attraction between the magnet 140 comprising the magnetic lens filter and the attachment frame (not shown) to which the magnet magnetically adheres is sufficiently strong to keep the magnetic lens filter 300 uniformly attached thereto while allowing the magnetic lens filter to be rotated at 350 to a desired position without breaking the magnetic hold of the magnet to the attachment assembly to the magnet.

Figure 5:
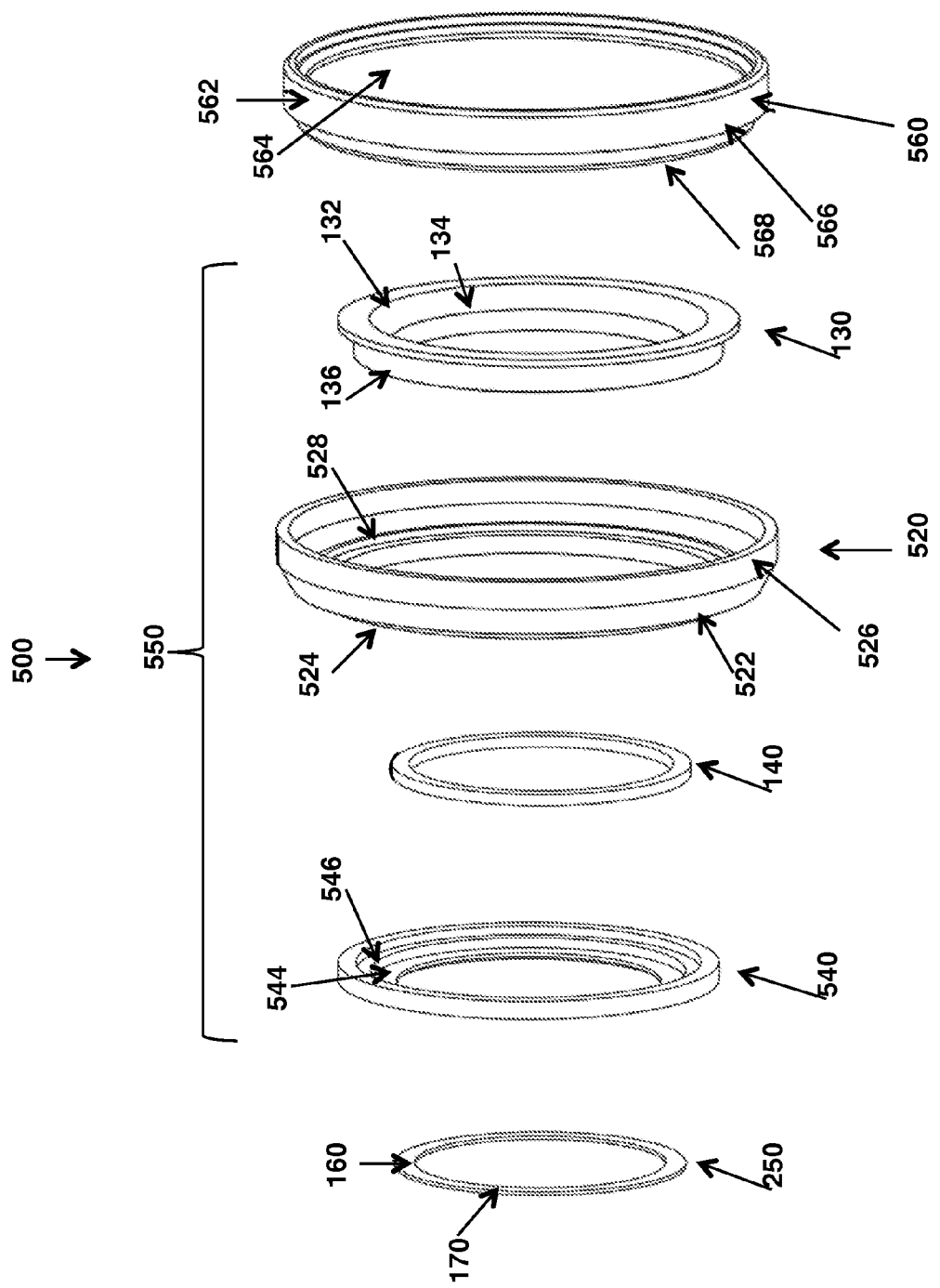
FIG. 5 is an exploded view of the components of an embodiment of a magnetic lens filter attachment system.

With continued reference to FIGS. 1 and 2E, FIG. 5 is an exploded view of another embodiment of a magnetic lens filter system 500. The system comprises a magnetic adapter assembly 550, the attachment assembly 250 and a threaded lens filter 560. The attachment assembly comprises the attachment frame 160 and the adhesive means 170 applied to the back surface of the attachment frame, as described herein (see FIG. 2E). The magnetic adapter assembly comprises from the front, as separate components, an inner stabilizing frame 510, a threaded lens filter frame 520, the magnet 140 and the outer stabilizing frame 130. The threaded lens filter has a front portion 562 comprising the lens filter optics 564 and a back portion 566 which is exteriorally threaded 568. The threaded lens filter can be any lens filter for a camera lens known in the art and has a diameter sufficient to threadably engage the threaded lens filter frame.

The outer stabilizing frame 540 is an open, circular frame with a supporting lip 544 extending interiorly from a back edge of the frame. The outer stabilizing frame has inner dimensions sufficient to receive the magnet therein such that the magnet is disposed on the surface of the supporting lip. The inner surface of the outer stabilizing frame is interiorly threaded 546 at the front edge. The magnet 140 is a ring with the open circular form as described herein. The inner stabilizing frame 130 is an open, circular frame having the flange 132 disposed exteriorly around the front edge 134, as described herein.

The threaded lens filter frame 520 is an open, circular frame with a back portion 522 exteriorly threaded 524 and a front portion 526 interiorly threaded 528. The outer diameter of the threaded back portion is sufficient to threadably engage the interiorally threaded 536 surface of the outer stabilizing frame 530. The inner diameter of the threaded front portion is sufficient to threadably engage the threaded lens filter.

Figure 6A:
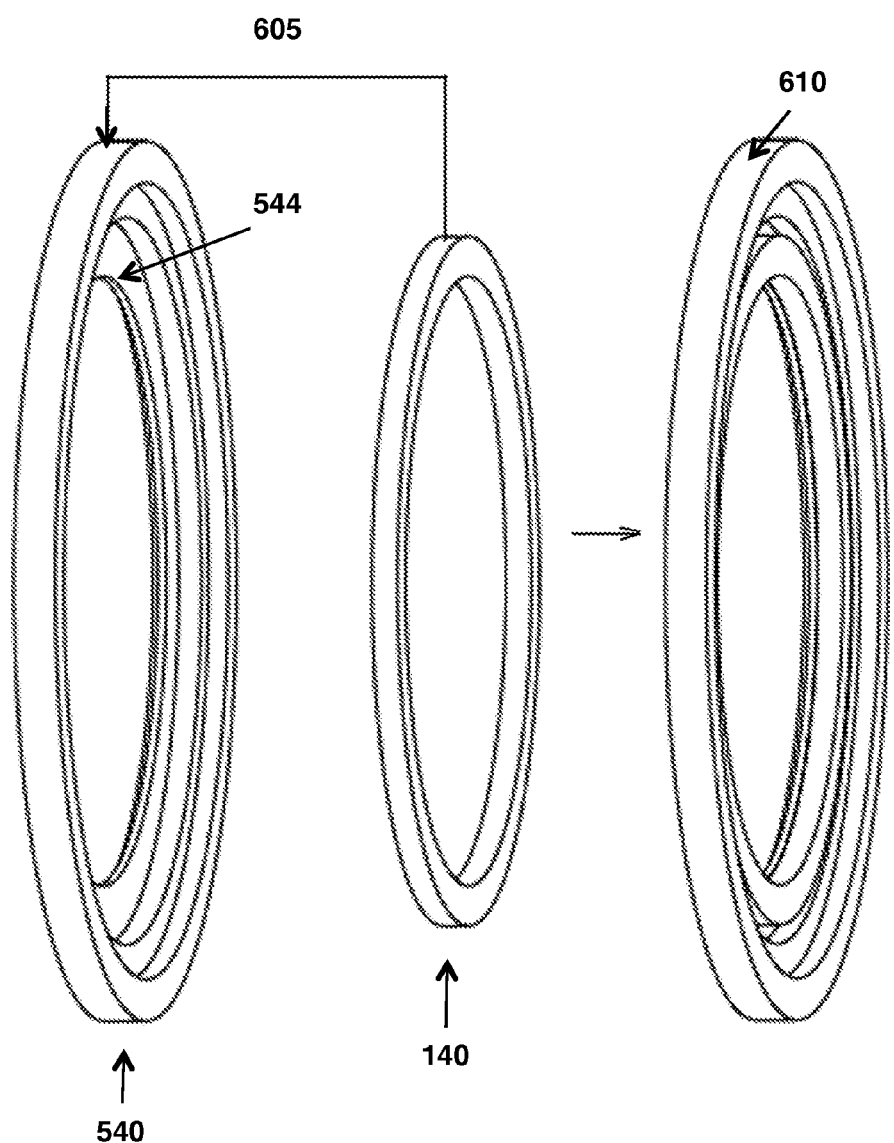
FIGS. 6A-6C depict the assembly of the magnetic attachment components.
Figure 6B:
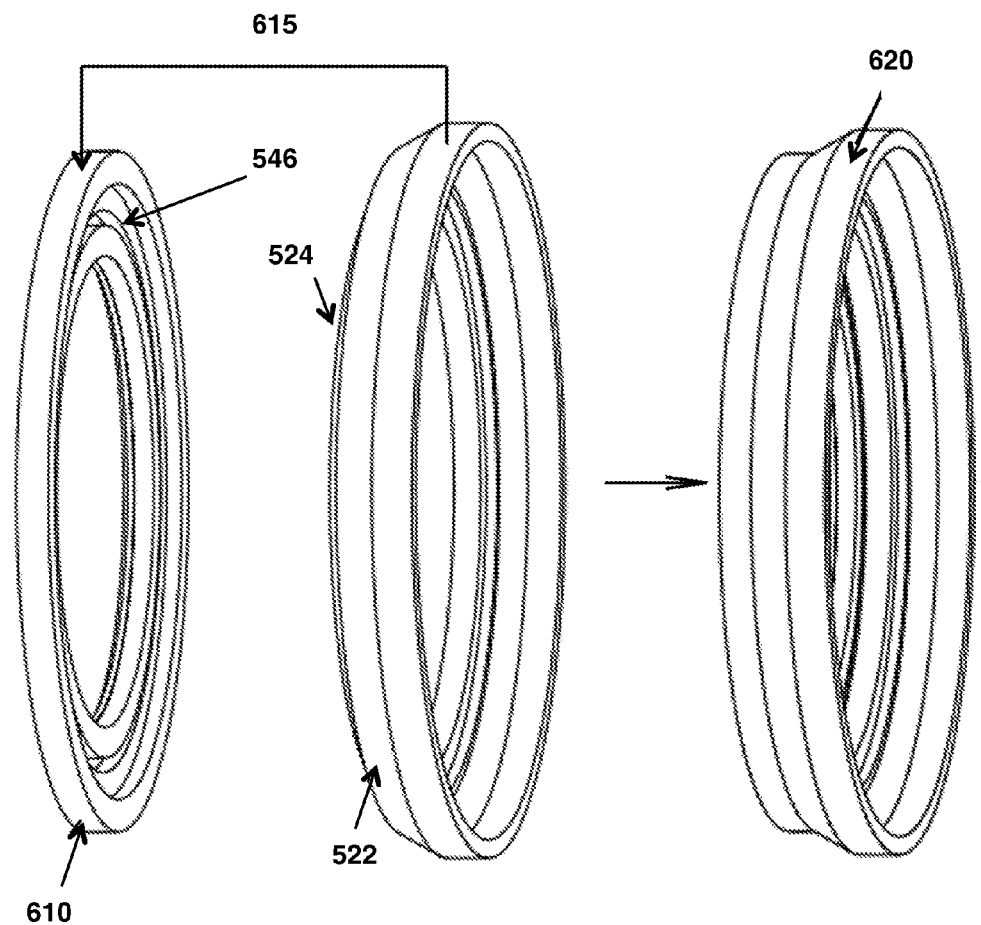
Figure 6C:
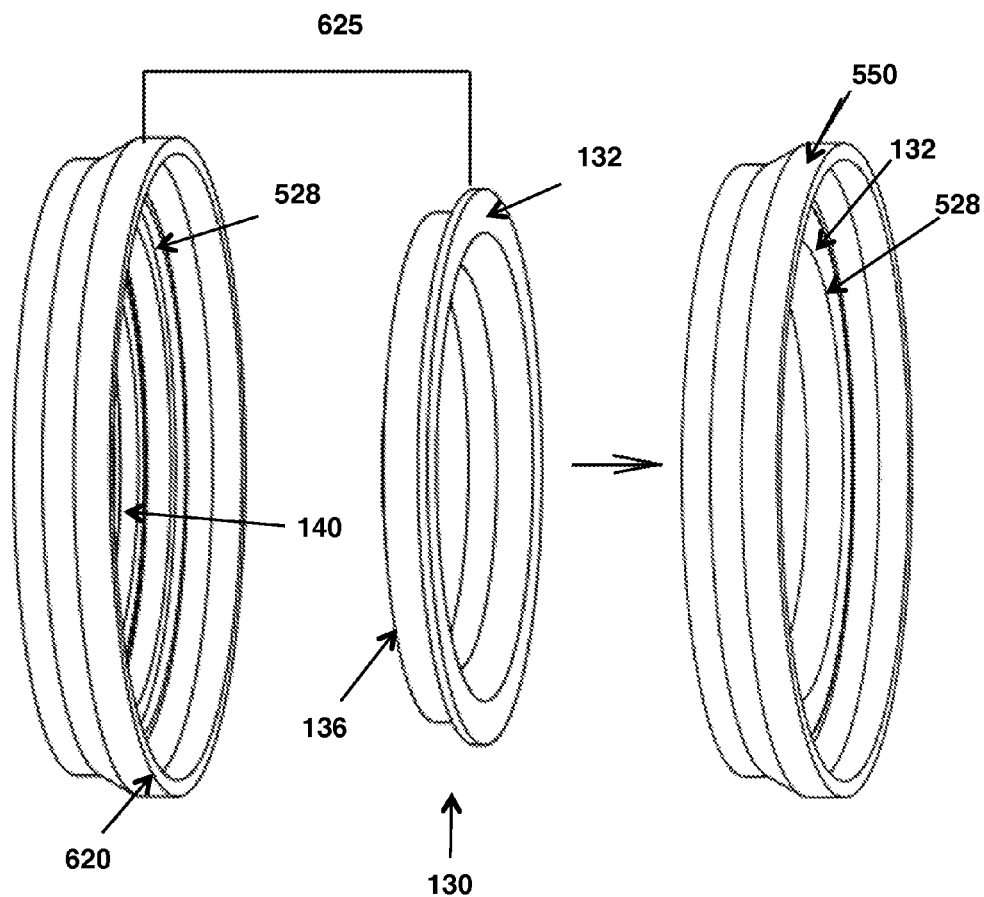

FIGS. 6A-6C illustrate the assembly of the magnetic adapter components. In FIG. 6A, the magnet 140 is loaded through the open front of the outer stabilizing frame 540 at 605 such that the back surface of the magnet 140 is disposed against the lip 544 thereof to form magnet assembly 610. In FIG. 6B, the threaded lens filter frame 520 is threadably engaged at 615 with the exteriorally threaded 524 back portion 522 to form assembly 620. In FIG. 6C, the inner stabilizing frame 130 is loaded into the front of assembly 620 at 625 to form magnet adapter assembly 550. The inner stabilizing frame is disposed within assembly 620 such that the back surface 136 of the inner stabilizing frame is proximate to the front surface of the magnet 140 and flange 132 is proximate to the interior threads 528 of the threaded lens filter frame 520 comprising assembly 220 without covering the same.

Figure 7B:
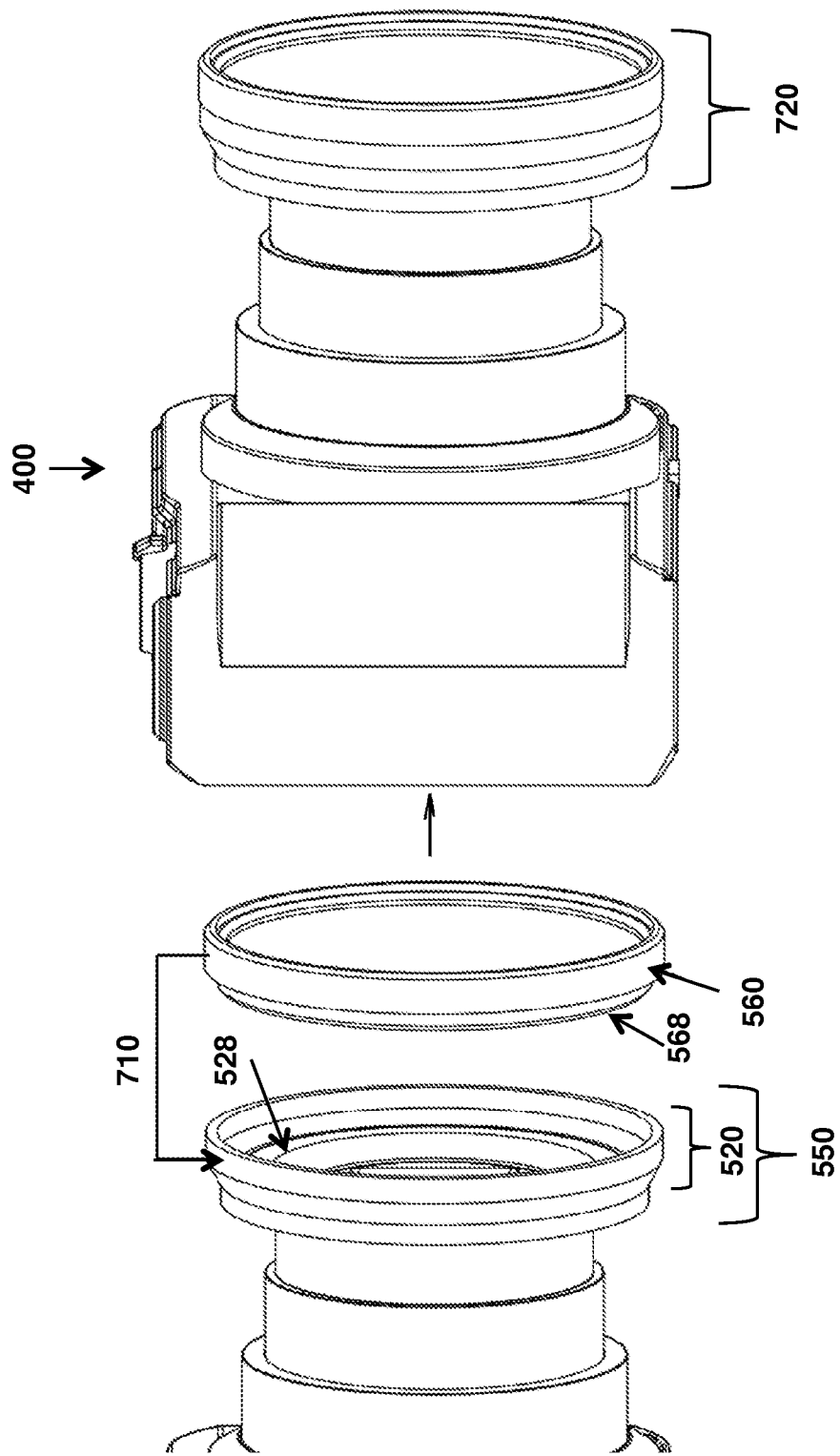
FIG. 7B depicts the attachment of the lens filter to the magnetic attachment assembly.

With continued reference to FIGS. 3A-3B and 4, FIGS. 7A-7B illustrate magnetic attachment of the magnetic adapter assembly to a camera lens and attachment of the threaded lens filter to the magnetic adapter assembly. In FIG. 7A, the magnet 140 of the magnetic adapter assembly 550 will magnetically affix itself at 705 to the magnetic attachment assembly 250. The magnetic attachment assembly 250 is affixed to the camera lens 410 on camera 400 as described herein (see FIG. 3A). The magnetic attraction between the magnetic adapter assembly and the magnetic attachment assembly keeps the magnet uniformly and securely affixed around the camera lens surface 412 (see FIG. 3B). In FIG. 7B the threaded lens filter 560 threadably engages the magnetic adapter assembly 550 at 710. The back portion 566 of the threaded lens filter is loaded into the front of the magnetic adapter assembly such that the exterior threads 568 engage the interior threads 528 of the threaded lens filter frame 520 to form a magnetic lens filter system 720 on camera 400. Alternatively, the threaded lens filter can be threadably secured to the magnetic adapter assembly prior to magnetically affixing the magnetic adapter assembly to the magnetic attachment assembly. The magnetic lens filter system 720 is rotatable around the camera lens without breaking the magnetic connection as described herein (see FIG. 4)

Figure 8:
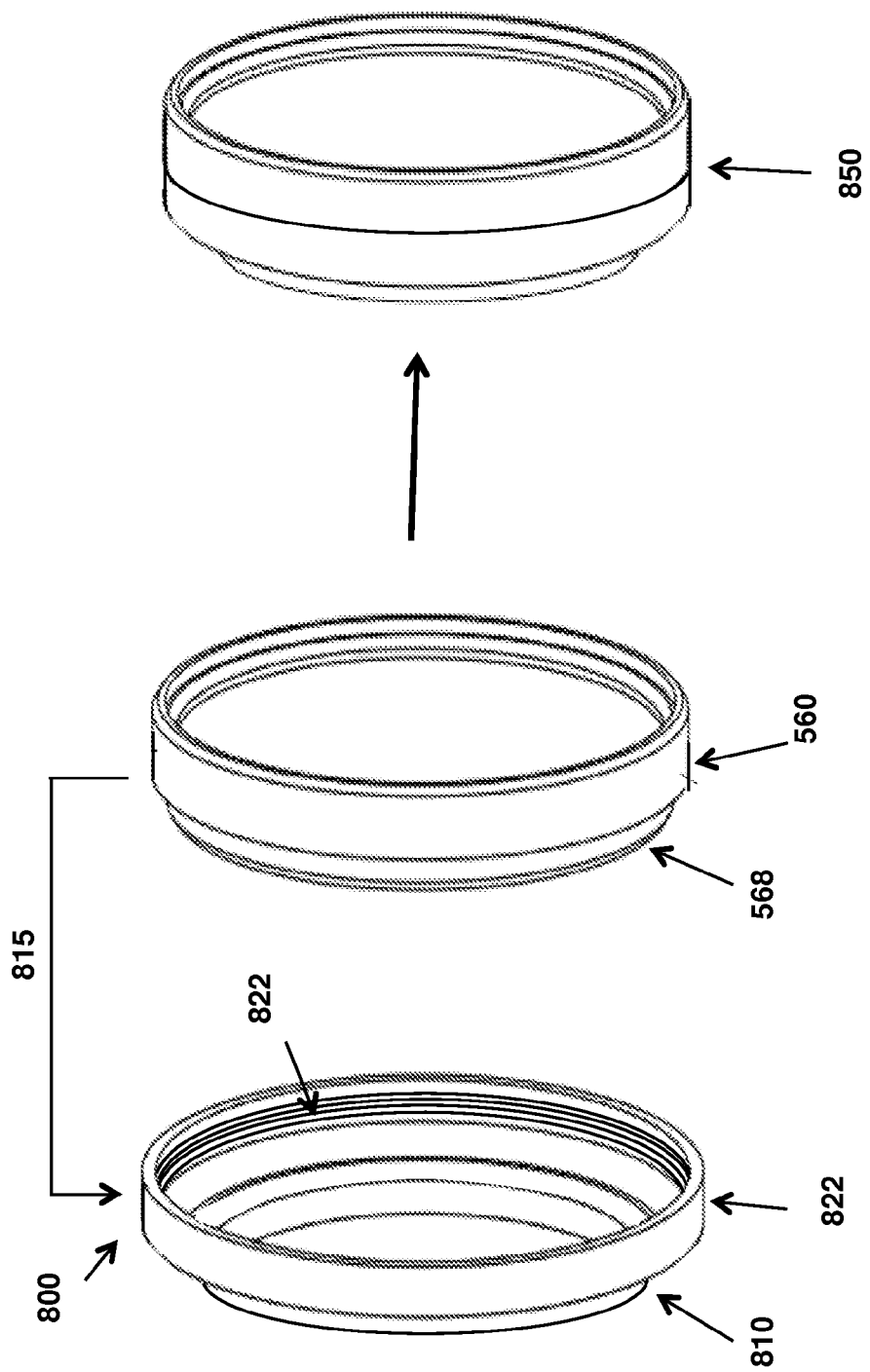
FIG. 8 depicts a magnetic adapter device and magnetic adapter system formed with a threaded lens filter.

FIG. 8 depicts a magnetic adapter device and system for magnetically attaching a lens filter to a camera lens. The magnetic adapter device 800 has an open, circular configuration with a magnetic back portion enclosing a magnet 810 and a front portion comprising a frame 820 circularly extending from the back portion. The magnetic back portion protects the magnet from the environment, dirt, corrosion, damage, etc. Generally, the magnet may comprise a single piece or a plurality of smaller pieces in any shape that can be accommodated by the back portion. As non-limiting examples, the magnet may comprise a single circular piece having a diameter to fit securely within the back portion or may comprise smaller individual magnets or magnetic beads uniformly disposed within the back portion. The frame is interiorly threaded 822 and comprises a lightweight, non-magnetic material, such as aluminum, a polymer or plastic, as is known in the art. The outer diameter of the frame portion is sufficient to threadably receive the threaded lens filter 560. The exterior threads 568 of the threaded lens filter threadably engage the interior threads 822 of the magnetic adaptor device at 815 to form the magnetic adapter system 850.

Figure 9:
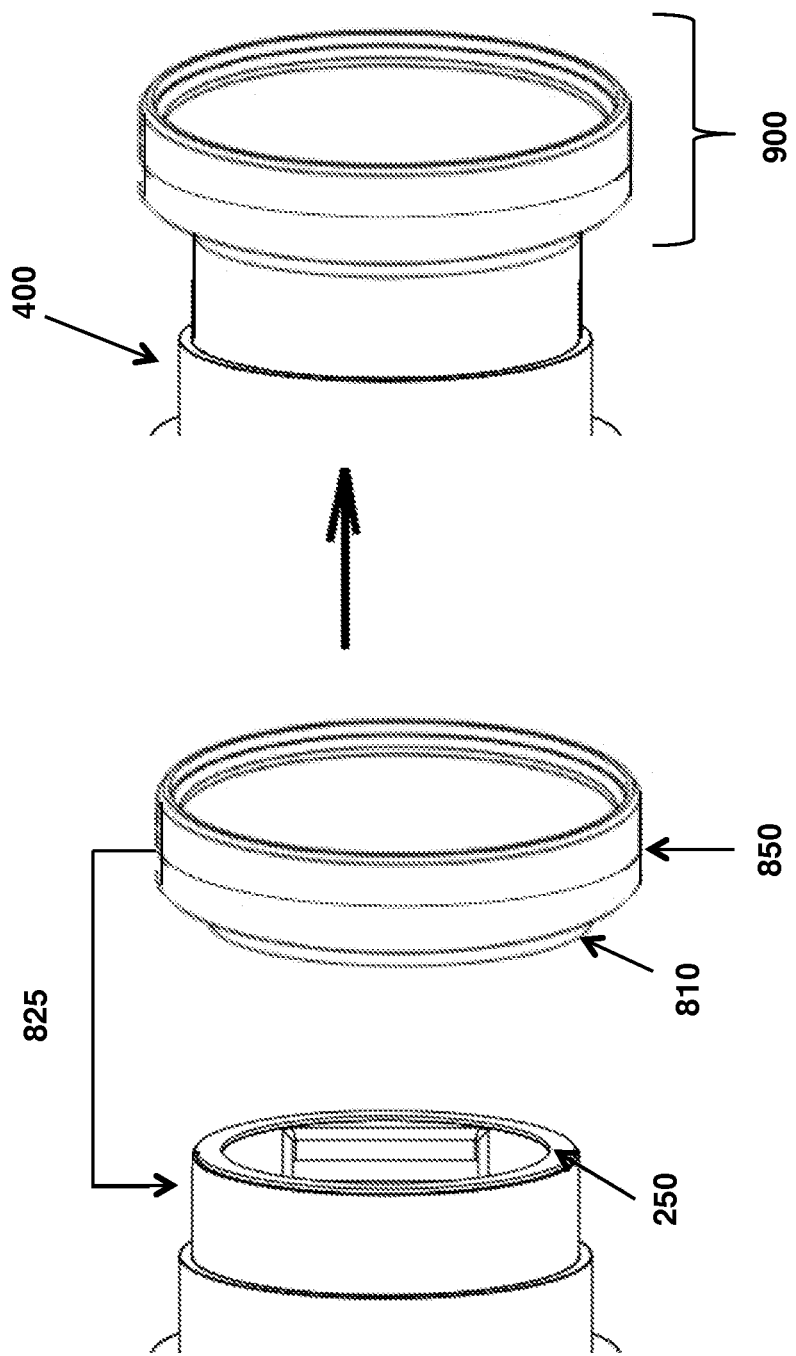
FIG. 9 depicts the attachment of the magnetic adapter system to the magnetic attachment assembly.

With continued reference to FIGS. 4 and 7A, FIG. 9 illustrates magnetic attachment of the magnetic adapter system to a camera lens. As described herein (see FIG. 7A), the magnetic attachment assembly 250 is affixed to the camera lens 410 on camera 400. The magnet portion 810 of the magnetic adapter system 850 is uniformly, magnetically attracted to the magnetic attachment assembly and thereby secures itself to the camera lens to form the magnetic lens filter system 900. As described herein (see FIG. 4), the magnetic lens filter system 900 is rotatable around the camera lens.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed is:

1. A magnetic adapter assembly for a lens filter, comprising a threaded magnet frame assembly that has:
   a threaded outer stabilizing frame having a magnet disposed therein
   a threaded lens filter frame configured to receive a threaded lens filter therein, said threaded lens filter frame threadably engaged with the threaded outer stabilizing frame; and
   an inner stabilizing frame disposed within the threaded lens filter frame proximately to and in a stabilizing relationship to the magnet.

2. The magnetic adapter assembly of claim 1, further comprising the threaded lens filter disposed within and threadably engaged with the threaded lens filter frame.

3. The magnetic adapter of claim 1, wherein the threaded lens filter frame comprises an exteriorly threaded back portion and an interiorly threaded front portion and wherein the outer stabilizing frame is interiorly threaded.

4. A magnetic lens filter system, comprising:
   the magnetic adapter assembly of claim 1; and
   an attachment assembly securable around a camera lens and magnetically engageable with the magnet comprising the magnet frame assembly.

5. The magnetic lens filter system of claim 4, wherein the attachment assembly comprises:
   an attachment frame having a magnetic metal incorporated therein; and
   an adhesive disposed on an inner surface of the attachment frame.

6. A camera system with rotatable lens filter, comprising:
a camera with camera lens;
the attachment assembly of claim 4 adhesively secured disposed in a covering relationship to the camera lens such that the magnet comprising the magnetic adapter assembly is magnetically and rotatably attached to the attachment frame.

\* \* \* \* \*